June 24, 1958
W. LEHMANN
2,840,741
ELECTROLUMINESCENT CELL
Filed Nov. 1, 1954
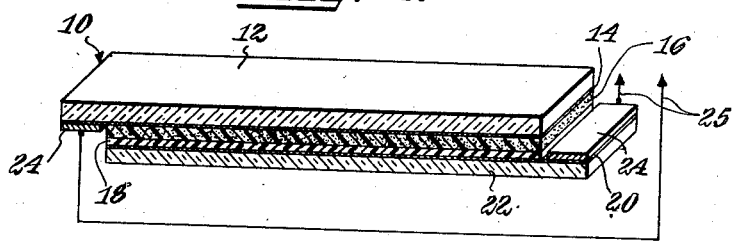
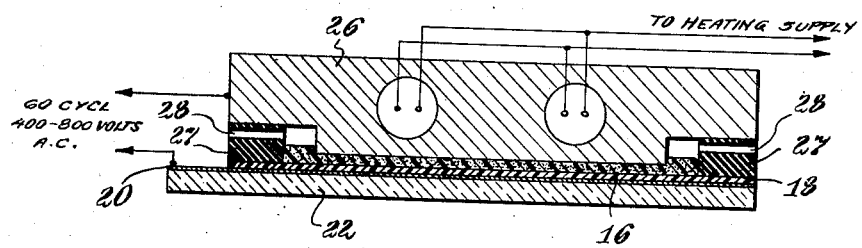
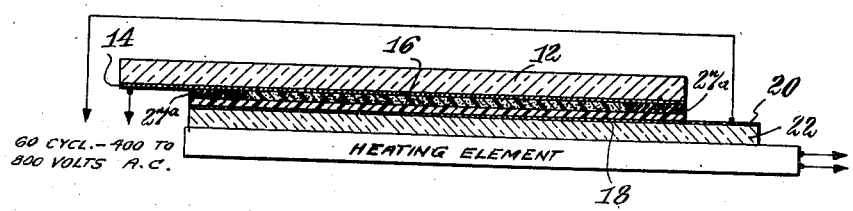
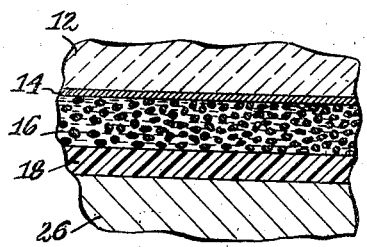 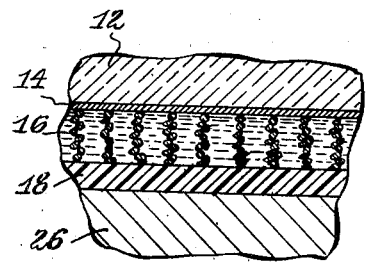
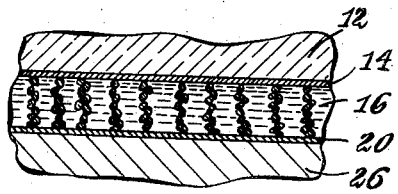
INVENTOR.
WILLI LEHMANN
BY
ATTORNEY.

United States Patent Office 2,840,741
Patented June 24, 1958

2,840,741
ELECTROLUMINESCENT CELL

Willi Lehmann, East Orange, N. J., assignor to Westinghouse Electric Corporation, East Pittsburgh, Pa., a corporation of Pennsylvania Application November 1, 1954, Serial No. 466,014

3 Claims. (Cl. 313—108)

This invention relates to electroluminescent cells and to phosphor embedded dielectrics for electroluminescent cells.

Heretofore, electroluminescent cells have been fabricated as disclosed in London, Edinburgh and Dublin Philosophical Magazine, series 7, vol. 38, pages 700–737 (October 1947), article by G. Destriau entitled "New Phenomenon of Electrophotoluminescence," or as disclosed in Patent No. 2,566,349 to Mager. Practical electroluminescent cells have normally consisted of a phosphor embedded throughout a dielectric material, which phosphor-dielectric is sandwiched between two electrodes. In such constructions, the phosphor materials are normally dispersed at random throughout the dielectric as disclosed by Mager and as suggested by Destriau in the last paragraph on page 713 of his aforementioned article.

Electroluminescent cells of the prior art have a relatively low brightness which has severely curtailed their practical application. It is the general object of this invention to improve the electroluminescent cells of the prior art by increasing their brightness without altering the operating conditions.

The aforesaid object of the invention, and other objects which will become apparent as the description proceeds, are achieved by providing an electroluminescent cell wherein the phosphor particles are embedded throughout a dielectric in a plurality of substantially straight-line particle groupings, which groupings are oriented so that they are substantially perpendicular to the cell electrodes.

For a better understanding of the invention reference sohuld be had to the accompanying drawings wherein:

Fig. 1 is a perspective view of an electroluminescent cell constructed in accordance with the teachings of the invention;

Fig. 2 is a sectional elevational view of a phosphor particle aligning and orienting apparatus showing the phosphor-dielectric as positioned in the apparatus during the particle alignment operation;

Fig. 3 is an alternative embodiment of a method of aligning and orienting the phosphor particles within the dielectric, which comprises treating the completely fabricated electroluminescent cell shown here in sectional elevation;

Fig. 4 is an expanded fragmentary sectional view of the phosphor-dielectric before the phosphor particles are aligned;

Fig. 5 is an expanded fragmentary sectional view showing the phosphor particles after they are aligned into groupings and the groupings oriented with respect to the electrode surfaces;

Fig. 6 is an expanded fragmentary sectional view showing an alternative embodiment of the invention after the phosphor particles have been aligned into groupings which are oriented with respect to the cell electrodes.

With specific reference to the form of the invention illustrated in the drawing, the numeral 10 in Fig. 1 indicates generally an electroluminescent cell comprising a first backing plate 12, first electrode 14, phosphor embedded dielectric 16, high dielectric constant layer 18, second electrode 20, second backing plate 22, electrode bus bars 24, and lead-in conductors 25. The first backing plate may be of transparent material such as glass, for example, and the first electrode 14 may be a thin transparent conducting layer, such as tin oxide, if desired. The tin oxide coating may be applied to the glass by means as described in Patent No. 2,522,531 to Mochel. The phosphor which is embedded in the dielectric may be any of the phosphors as disclosed by Destriau at page 710 of his aforementioned article or any other electric field-responsive phosphor. For example the phosphor may be 90% zinc sulphide and 10% zinc oxide, activated by $10^{-3}$ parts by weight of copper. As a further example, the phosphor may be zinc sulphide, activated by copper and lead.

The dielectric material may be either thermoplastic or thermosetting. Examples of suitable thermosetting dielectrics are polyester resins, epoxy resins, arcylic monomers such as methyl methacrylate monomer or monomeric styrene. Examples of suitable thermoplastic dielectric materials are Canada balsam, polymerized ethyl methacrylate or a low molecular weight polyvinyl acetate. The second electrode 20 may be a thin film of aluminum or other conducting material, or, if desired, may be a thin film of tin oxide. Of course, at least one of the electrodes sould be light-transmitting. The second backing plate 22 may be of opaque, translucent or transparent material (for example, glass) as desired, depending upon whether the second electrode is transparent. The second backing plate 22 may be eliminated, if desired, by forming the second electrode 20 of vacuum-metallized aluminum over the phosphor-dielectric, vacuum-metallizing techniqeus being well-known.

The busbars 24 may be strips of copper and may be applied as outlined in Patent No. 2,628,299 to Gaiser. The thin layer of high dielectric constant material 18 is not necessary to the operation of the cell, but is desirable to prevent a breakdown at higher operating voltages across the aligned phosphor groupings. This thin layer of high dielectric constant material may be fabricated of mica, for example, or other high dielectric constant material, of a thickness of 0.1 mm., for example.

There is illustrated in Fig. 2 an apparatus for aligning the phosphor particles into groupings and orienting the groupings with respect to the cell electrodes, and then solidifying the dielectric material in which the phosphor is suspended. A backing plate 22 carrying an electrode 20 forms the base for the phosphor aligning apparatus. If desired, the high dielectric constant material layer 18 may be placed over the electrode 20 and the phosphor-dielectric 16 placed thereon, as illustrated. A heater element 26, the lower portion of which has the desired configuration of the electroluminescent cell, is lowered over the high dielectric constant layer 18, as illustrated. Spacing members 27, which also act to seal against the egress of the phosphor-dielectric suspension before solidification of the dielectric, accurately position the upper surface of the high dielectric constant layer 18 and the lower surface of the heater element with respect to one another. It is the space between the two which will determine the thickness of the phosphor-dielectric layer, and this spacing may be 0.2 mil, for example. The phosphor-dielectric suspension is then placed onto the layer 18 and the heating element 26 placed thereover. If the viscosity of the phosphor-dielectric suspension is quite low the heater element may first be placed onto the partially fabricated cell and the fluid phosphor-dielectric suspension then inserted through the overflow ports 28 which are positioned through the spacing elements. The field is then placed across the phosphor suspended in the dielectric by placing a high voltage across the heater element 26 and the second electrode 20. Upon application of the field the heater element is energized to solidify the dielectric in the case of a thermosetting dielectric and the particle aligning and orienting field is maintained until the dielectric is completely solidified. If a thermoplastic dielectric is utilized, the heater element is used to render the dielectric fluid and the particles are then aligned. After particle alignment, the applied heat is removed and the aligning field is maintained until the dielectric solidifies.

The relative amounts of phosphor and dielectric and the thickness of the phosphor-dielectric are not particularly critical and both are more a matter of choice and design as indicated by the application. By way of example, and not of limitation, following are six specific examples for phosphor-dielectrics which may be used, including the method and technique used in soldifying the dielectric material.

*Example 1*

| | |
|---|---|
| Applied voltage | 400–800 volts—60 cycles or D. C. |
| Separation of electrodes | 0.3 mm. |
| Separate high dielectric constant layer | Mica—0.1 mm. thick. |
| Dielectric (thermoplastic) | Canada balsam. |
| Phosphor | Zinc sulphide:Cu:Pb. |
| Ratio of phosphor weight to dielectric weight | 1–2. |
| Fluid temperature of dielectric —maintained for 2 min. | 66° C. |

*Example 2*

See Example 1 for applied voltage, and fluid temperature.

| | |
|---|---|
| Separation of electrodes (no separate high dielectric constant layer) | 0.2 mm. |
| Dielectric (thermoplastic) | Polyvinyl acetate-molecular weight, 3500. |
| Phosphor | 90% ZnS, 10% ZnO: $10^{-3}$ parts by weight Cu. |
| Ratio of phosphor weight to dielectric weight | 1–1. |

*Example 3*

As in Example 2, but substitute polymerized ethyl methacrylate for the dielectric. Also fluid temperature of dielectric is 160° C.

*Example 4*

| | |
|---|---|
| Applied voltage | 400–800 volts—60 cycles or D. C. |
| Separation of electrodes | 0.3 mm. (including 0.1 mm. separate layer of high dielectric constant material). |
| Dielectric (ratio by weight of phosphor to dielectric, 1–2) | Polyester resin (having added thereto 2% by weight benzoyl peroxide catalyst). |
| Phosphor | 90% ZnS, 10% ZnO: $10^{-3}$ parts by weight of Cu. |
| Polymerizing heat | 120° C.—polymerizes in 5 minutes. |

*Example 5*

As in Example 4 but dielectric material is epoxy resin with 6% by weight of diethylenetriamine catalyst—polymerizes in 15 minutes at 100° C. *Note.*—Epoxy resins may be defined as polymerizing resins having the epoxide group

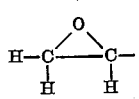

as the polymerizing unit.

*Example 6*

As in Example 4 but the dielectric material is monomeric styrene having 2% by weight of benzoyl peroxide catalyst. Polymerizes in 20 minutes at 65° C. Also, no separate high dielectric constant layer is used and electrode separation is 0.3 mm.

While six specific examples of different dielectric materials have been given, many more can be used, as is obvious, provided the dielectric is solid at room temperatures and, if thermoplastic, will become fluid at elevated temperatures without charring.

There is shown in Fig. 3 a modified method for aligning the phosphor particles within the dielectric, in which modified method the cell is first fabricated and then is either placed on the heating element as illustrated, or placed in an oven, while a field is applied to the cell electrodes to align and orient the phosphor particles. In such an embodiment the spacing elements 27a serve to confine the dielectric within the cell, while the dielectric is in a fluid status, and also serve to maintain the proper spacing between the cell electrodes. In such an embodiment as illustrated, the dielectrics may be varied, as heretofore noted for example, and the applied heat and electric fields may be likewise varied.

There is illustrated in Fig. 4 the phosphor-dielectric suspension before the particles are aligned and, as shown, the phosphor particles are dispersed at random throughout the dielectric. After the phosphor particles are aligned and the dielectric solidified, the particle groupings remain aligned and oriented so that they extend substantially from one electrode to the high electric constant layer, as illustrated in Fig. 5.

If the high dielectric constant material layer 18 is eliminated, the phosphor particle groupings will extend substantially from one electrode 14 to the other electrode 20, as illustrated in Fig. 6. It should be noted that the alignment of the phosphors in the fluid dielectric under the influence of the field is thought to be primarily a dielectric phenomenon.

When an electric field having a strength of $4 \times 10^4$ volts/cm. was applied across a phosphor-dielectric layer of a thickness of 0.2 mm., in a cell generally as illustrated in Fig. 1, wherein the phosphor particles were dispersed at random throughout the dielectric, a brightness of 30 arbitrary brightness units was observed. The phosphor particles were then aligned in the dielectric by methods as previously outlined, and a field of $4 \times 10^4$ volts/cm. was applied between the electrodes across the aligned phosphor and the dielectric. Under these conditions a brightness of 90 arbitrary brightness units was observed. Thus merely by aligning the phosphor particles into groupings and orienting the groupings with respect to the cell electrodes, other conditions remaining the same, the brightness of the electroluminescent cells as illustrated is tripled.

There are two possible explanations for this increase in brightness, although it is not certain if either of these suggested possibilities supplies all or even a part of the answer. First, the phosphor particles are aligned in substantially straight groupings from one cell electrode to the next, which groupings are substantially perpendicular to the cell electrodes. Under such alignment and orientation the field flux passing from one electrode to the other electrode will, at portions of the cell, only pass through dielectric material, and at other positions of the cell the field flux will only pass through aligned phosphor groupings. For example, see Figure 5 where between the phosphor groupings the field will pass through nothing but dielectric. However, since little power is lost to the dielectric this does not materially decrease the efficiency of the cell. In the cells of the prior art, where the phosphor particles were dispersed at random throughout the dielectric, the field flux would alternately pass through phosphor and then dielectric, allowing a large portion of the applied field to be expended within the dielectric and not within the phosphor particles, which absorb power from the field and generate the light. Where the particles are aligned, however, the field expenditure encountered in alternately passing through phosphor particles and dielectric will be substantially eliminated and the applied field will be more fully utilized, thus increasing the cell brightness.

As a second possibility, where the phosphor particles are aligned into groupings, there will be many more phosphor particles contacting one another than where the phosphor particles are dispersed at random throughout the dielectric. It is a well-established fact that when phosphor particles contact each other an intrinsic surface barrier is set up, and it is also well-established that intrinsic surface barriers enhance electroluminescence. Thus by increasing the number of intrinsic surface barriers, the electroluminescence is enhanced. Whatever the explanation, however, the brightness for the electroluminescent cells has been increased by merely aligning the phosphor particles into groupings and orienting these groupings with respect to the cell electrodes.

It will be recognized that the objects of the invention have been achieved by providing an electroluminescent cell wherein the brightness is increased without altering the operating conditions.

It should be noted that variations in methods of aligning the phosphor in the dielectric are immediately suggested. For instance, in Example 2 a water-emulsion of an acrylic resin sold commercially under the trademark "Roplex" by Rohm and Haas, Philadelphia, Pa., may be mixed with the phosphor. With such a dielectric material, solidification will occur at room temperatures. Also in Example 5, an epoxy resin such as sold by Shell Chemical Corp., New York, N. Y., under the trademark Epon 828 will polymerize at room temperatures in about 30 minutes with a diethylenetriamine catalyst. This eliminates the need for a separate heating technique. Other room temperature solidifying dielectric materials may, of course, be used, as is obvious to one skilled in the art.

While in accordance with the patent statutes one best-known embodiment of the invention has been illustrated and described in detail, it is to be particularly understood that the invention is not limited thereto or thereby.

I claim:

1. An electroluminescent cell comprising, two substantially parallel electrodes, at least one of which is light-transmitting, and electric field-responsive phosphor particles embedded in dielectric material between said electrodes, said dielectric material being solid at normal room temperatures, said phosphor particles being aligned in generally random fashion in a plurality of substantially straight-line particle groupings, adjacent phosphor particles in each of said groupings contacting one another, and each of said groupings being oriented substantially perpendicular to said electrodes.

2. An electroluminescent cell comprising, two substantially parallel electrodes, at least one of which is light-transmitting, and electric field-responsive phosphor particles embedded in dielectric material between said electrodes, said dielectric material being polymerized plastic material which is solid at normal room temperature, said phosphor particles being aligned in generally random fashion in a plurality of substantially straight-line particle groupings, adjacent phosphor particles in each of said groupings contacting one another, and each of said groupings being oriented substantially perpendicular to said electrodes.

3. An electroluminescent cell comprising, two substantially parallel electrodes, at least one of which is light-transmitting, and electric field-responsive phosphor particles embedded in dielectric material between said electrodes, said dielectric material being solid at normal room temperatures and fluid at elevated temperatures, said phosphor particles being aligned in generally random fashion in a plurality of substantially straight-line particle groupings, adjacent phosphor particles in each of said groupings, contacting one another, and each of said groupings being oriented substantially perpendicular to said electrodes.

References Cited in the file of this patent

UNITED STATES PATENTS

| Number | Name | Date |
|---|---|---|
| 1,918,848 | Land et al. | July 18, 1933 |
| 2,584,441 | Frendendall | Feb. 5, 1952 |
| 2,588,560 | Picard | Mar. 11, 1952 |
| 2,624,857 | Mager | Jan. 6, 1953 |
| 2,709,765 | Koller | May 31, 1955 |
| 2,728,870 | Gungle et al. | Dec. 27, 1955 |